(12) United States Patent
Kamikawa et al.

(10) Patent No.: US 6,372,016 B1
(45) Date of Patent: Apr. 16, 2002

(54) METHOD FOR DRYING COMPACTS

(75) Inventors: Susumu Kamikawa; Kouichi Hirata; Hironori Fujioka; Hideaki Mizuki; Keiichi Sato, all of Hiroshima (JP)

(73) Assignee: Mitsubishi Heavy Industries, LTD, Tokyo (JP)

( * ) Notice: Subject to any disclaimer, the term of this patent is extended or adjusted under 35 U.S.C. 154(b) by 0 days.

(21) Appl. No.: 09/610,478

(22) Filed: Jul. 5, 2000

(30) Foreign Application Priority Data

Sep. 17, 1999 (JP) .......................................... 11-263264

(51) Int. Cl.$^7$ ............................................. C21B 11/00
(52) U.S. Cl. ............................... 75/484; 75/504; 75/751
(58) Field of Search ..................... 75/484, 503, 504, 75/751

(56) References Cited

U.S. PATENT DOCUMENTS 3,443,931 A * 5/1969 Beggs et al. ................... 75/484
3,836,353 A * 9/1974 Holley .......................... 75/479
3,868,246 A * 2/1975 Boss ............................. 75/756

FOREIGN PATENT DOCUMENTS

WO          96/32510 A1     10/1996

* cited by examiner

*Primary Examiner*—Melvyn Andrews
(74) *Attorney, Agent, or Firm*—Birch, Stewart, Kolasch & Birch, LLP (57) ABSTRACT

An apparatus for producing reduced iron, and a compact drying method for application to the apparatus are disclosed. The apparatus comprises a pelletizer or a briquetter for mixing and agglomerating coal as a reducing agent and iron ore as iron oxide to form compacts, a dryer for drying the compacts, a circular rotary hearth type reducing furnace for reducing the dried compacts in a high temperature atmosphere, a first heat exchanger for performing heat exchange between a hot off-gas discharged from the reducing furnace and combustion air to be supplied to the reducing furnace, and coolers for cooling the hot off-gas. A second heat exchanger for heating drying air is disposed on an exit side of the first heat exchanger. The drying air heated by the second heat exchanger is supplied to the dryer to dry the compacts with the drying air scant in moisture. Consequently, highly efficient, stable drying in the dryer can be performed, and high quality reduced iron can be produced stably.

11 Claims, 6 Drawing Sheets

Fig.1(a)

Conditions and Results of WGC Drying

| Item | Heating gas temp. | Moisture concentration | V.M. generation | Compact rupture | Evaluation |
|---|---|---|---|---|---|
| — | °C | vol% | — | — | — |
| 1 | 270 | 40.0 | ○ | ○ | ● |
| 2 | 270 | 0.0 | ○ | × | × |
| 3 | 230 | 0.0 | ○ | × | × |
| 4 | 150 | 0.0 | ○ | ○ | ● |
| 5 | 500 | 19.0 | × | × | × |
| 6 | 400 | 16.6 | × | × | × |
| 7 | 300 | 14.4 | ○ | × | × |
| 8 | 300 | 16.6 | ○ | × | × |
| 9 | 250 | 13.3 | ○ | × | ● |
| 10 | 160 | 7.4 | ○ | ○ | ● |
| 11 | 160 | 4.5 | ○ | ○ | ● |
| 12 | 120 | 10.8 | ○ | ○ | ● |

Fig.1(b)

Relation between Moisture Concentration in Heating Gas and Temperature of Heating Gas

METHOD FOR DRYING COMPACTS

BACKGROUND OF THE INVENTION

1. Field of the Invention

The present invention relates to an apparatus for producing reduced iron, which comprises mixing a reducing agent and iron oxide, agglomerating the mixture, drying the compacts (pellets, or briquettes) in a dryer, and reducing the dried compacts in a high temperature atmosphere in a reducing furnace. This invention also relates to a method for drying compacts, which method is applied to the apparatus.

2. Description of the Related Art

To produce reduced iron, the first step is to mix an iron ore powder, a coal powder, a limestone powder, and a binder, and compress and agglomerate the mixture to form wet compacts called green compacts. Then, the wet compacts are dried to some degree to form dry compacts. The dry compacts are heated to a high temperature in a reducing furnace, where iron oxide in the iron ore is reduced with the coal (a reducing agent) to form reduced iron compacts.

Figure 6:
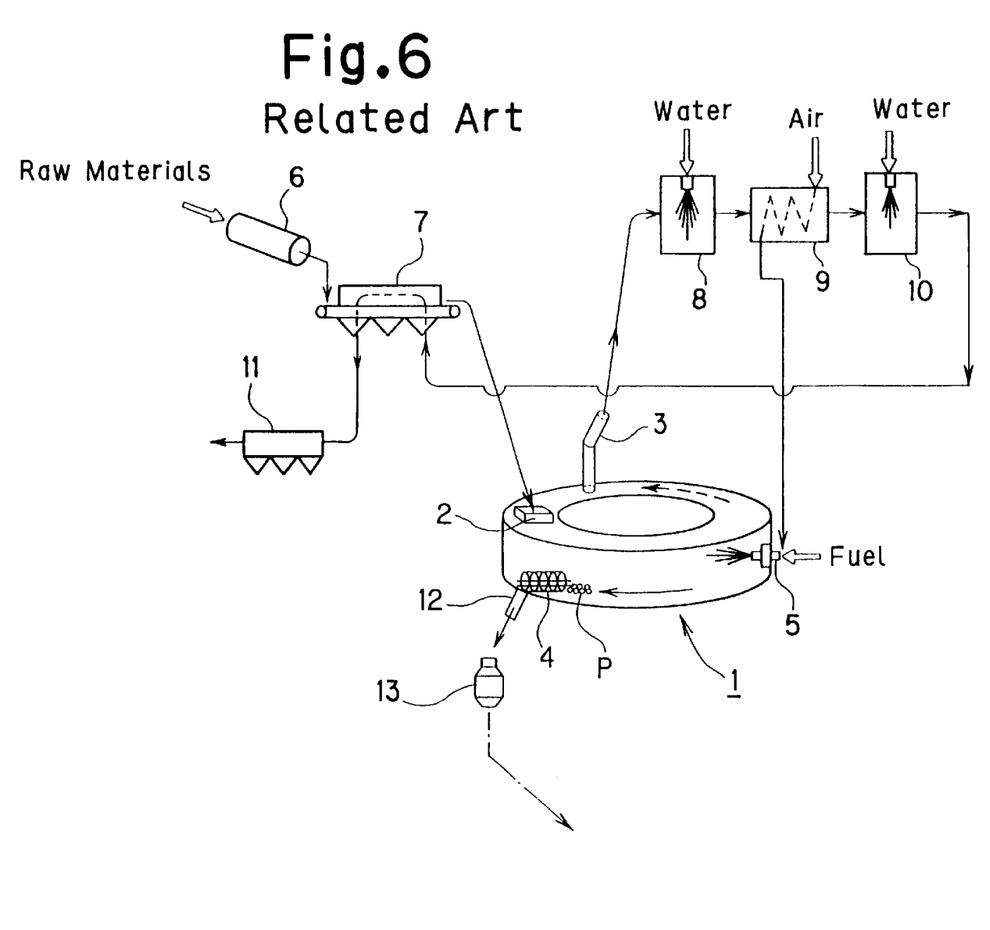
FIG. 6 is a schematic constitution drawing of a conventional apparatus for producing reduced iron.

An example of a conventional apparatus for producing reduced iron is explained by way of FIG. 6. At an upper portion of a circular rotary hearth type reducing furnace 1, there are provided a device 2 for introducing compacts (dry compacts), and an off-gas duct 3 for discharging a hot off-gas, a residual form of a gas used in reduction. Inside the furnace 1, a discharger 4 is provided for discharging reduced compacts P (reduced iron compacts). On a circumferential side wall of the furnace 1, a plurality of burners 5 are provided for generating a reducing hot gas.

Powders of coal (a reducing agent), iron ore, etc. as raw materials are mixed with a binder, and the mixture is fed to a pelletizer or a briquetter 6, where compacts (wet compacts) are formed. The resulting compacts are sent to a dryer 7, where the compacts are dried at about 120 to 150° C. to become dry compacts. The dry compacts are supplied to a rotary hearth of the reducing furnace 1 via the introducing device 2.

In the reducing furnace 1, fuel and combustion air are fed to the burners 5, which generate a high temperature hot gas. The hot gas turns in the direction of a dashed arrow, and during this motion, exerts a reductive action on the compacts, an object to be treated, in a high temperature atmosphere. A hot off-gas discharged through the off-gas duct 3 is primarily cooled by a primary cooler 8 of a water spray type, and then brought to a heat exchanger 9, where the off-gas exchanges heat with the combustion air. Further, the off-gas is secondarily cooled by a secondary cooler 10 of a water spray type to about 300° C., for example. Then, the cooled off-gas is conveyed to the dryer 7 to dry the compacts. Then, the off-gas is passed through a dust collector 11, where it is cleaned, and then dissipated into the air.

When the rotary hearth inside the reducing furnace 1 makes nearly one rotation in the direction of a solid arrow in FIG. 6, the reduced compacts P are discharged from the screw type discharger 4. The compacts are delivered to a portable container 13 by a discharge chute 12, and then transported to a subsequent step.

In the dryer 7 of the foregoing conventional apparatus for producing reduced iron, the hot off-gas discharged from the reducing furnace 1 and cooled by the water spray type primary cooler 8 and secondary cooler 10 is used as a heat source for drying the compacts (wet compacts) at a temperature of about 120 to 150° C. That is, the compacts are dried with the hot off-gas very rich in steam. Hence, on an unsteady occasion immediately after initiation of operation of the apparatus, moisture is condensed onto the surfaces of the wet compacts. As a result, sticking of the wet compacts to each other occurs, whereupon the wet compacts may lump, becoming large masses. In a situation such as that immediately after start of operation, the properties, such as temperature and flow rate, of the hot off-gas discharged from the reducing furnace 1 are not stable, so that drying in the dryer 7 is unstable. This may cause the problem of wet compact lumping.

The wet compacts, which have been treated in the dryer 7 during such an unsteady operation, may have moisture remaining in the compacts. If such wet compacts are rapidly heated in the reducing furnace 1 in a subsequent step, surface portions of the compacts may peel off, or the compacts may rupture.

A heating gas in a dryer like the above-mentioned dryer 7, or in a dryer using hot air from a heat exchanger or the like as a heat source for drying compacts (wet compacts), may cause compact rupture, or formation of a combustible gas from coal in the compacts, if the temperature of the heating gas is high. To avoid these risks, the maximum temperature of the heating gas is set at 200° C. or lower. Depending on the moisture content, etc. of the heating gas, however, a higher gas temperature than that may be set. Since a conventional dryer uses a heating gas whose temperature has been set to be somewhat low, it has posed the problem of taking time for drying compacts.

In an apparatus for producing reduced iron, which uses coal as a reducing agent, volatile matter (hereinafter referred to as VM), such as $CO$, $CH_4$, $H_2O$, $CO_2$ and $N_2$, occurs from coal, if the temperature of the heating gas is too high. At a high oxygen concentration, therefore, coal may catch fire. Once VM develops in the dryer, the VM cannot be utilized as a heat source in the reducing furnace in the subsequent step. This poses the disadvantage that the thermal efficiency of the reducing furnace lowers. If the temperature of the heating gas is the sulfuric acid dew point (120° C.) or lower, on the other hand, corrosion will be induced because of dew formation in piping, etc. inside the dryer.

As described above, temperature control for the heating gas is of vital importance in efficiently drying compacts (wet compacts) in a dryer. There has been an intense demand for the realization of a dryer capable of stable drying.

SUMMARY OF THE INVENTION

The present invention has been proposed in light of these circumstances. It is an object of this invention to provide an apparatus for producing reduced iron, which can perform highly efficient, stable drying in a dryer and produce high quality reduced iron stably; and also to provide a method for drying compacts which is applied to the apparatus.

A first aspect of the present invention, as a means of attaining the above object, is a method for drying compacts, the method being applied to an apparatus for producing reduced iron by mixing and agglomerating a powder of a reducing agent and a powder of iron oxide in a pelletizer to form compacts or in a briquetter to form briquettes, drying the compacts (pellets, or briquettes) in a dryer, and reducing the dried compacts in a high temperature atmosphere in a reducing furnace, wherein a temperature range of a heating gas supplied to the dryer is set based on the following equation:

$$\text{Sulfuric acid dew point} \leq T_g \leq 100/40 \cdot C_{H_2O} + 200$$

where $T_g$ denotes the temperature [° C.] of the heating gas, and $C_{H2O}$ denotes a moisture concentration [vol %] in the heating gas.

According to the above aspect of the invention, a high gas temperature adapted for the moisture concentration (moisture content) in the heating gas can be set. Thus, the drying time can be shortened, and highly efficient, stable drying can be performed, so that high quality reduced iron can be produced stably. Furthermore, the temperature of the heating gas on the exit side of the dryer is a high temperature above the sulfuric acid dew point. Thus, acid corrosion of piping, etc. minimally occurs.

In the method for drying compacts as the first aspect of the invention, the apparatus for producing reduced iron may use coal as the reducing agent, and the temperature $T_g$ of the heating gas may be set at $T_g \leq 300°$ C. Thus, compact rupture or formation of VM from coal in the dryer can be prevented. Consequently, ignition of coal, or a decrease in the thermal efficiency in the reducing furnace in the subsequent step can be prevented.

A second aspect of the invention is an apparatus for producing reduced iron, comprising a pelletizer or a briquetter for mixing and agglomerating a reducing agent and iron oxide to form compacts, a dryer for drying the compacts, a reducing furnace for reducing the dried compacts in a high temperature atmosphere, a first heat exchanger for performing heat exchange between a hot off-gas discharged from the reducing furnace and combustion air to be supplied to the reducing furnace, and a cooler for cooling the hot off-gas, wherein a second heat exchanger for heating drying air is disposed on an exit side of the first heat exchanger, and the drying air heated by the second heat exchanger is supplied to the dryer.

According to this aspect of the invention, compacts (wet compacts) are dried with moisture-poor drying air. Thus, sticking of the compacts to each other does not take place (compacts are prevented from becoming large lumps), and the compacts are uniformly dried. Since the compacts are uniformly dried to leave no moisture behind inside the compacts, peeling of the surface portion, or rupture of the compacts can be avoided in the reducing furnace in the subsequent step. Moreover, high quality dry compacts are formed, and the supply of these compacts to the rotary hearth type reducing furnace can result in the stable production of high quality reduced iron.

In the apparatus for producing reduced iron as the second aspect of the invention, the cooler may be a water spray type first cooler provided upstream from the first heat exchanger, an air introduction type second cooler may be provided on a path bypassing the first cooler, and a control means may be provided for switching a valve provided at a bifurcation upstream from the bypass path to select either the first cooler or the second cooler based on a trade-off between a flow rate of the hot off-gas and a flow rate of the compacts to the dryer. Thus, in addition to the same actions and effects as obtained by the second aspect of the invention, the heat exchange efficiency of the first heat exchanger and the second heat exchanger is increased. Consequently, even more efficient, stable drying can be performed in the dryer.

In the apparatus for producing reduced iron as the second aspect of the invention, moreover, a hot stove for generating a hot gas may be disposed on a drying air introduction side of the dryer, and the hot gas generated by the hot stove and the drying air heated by the second heat exchanger may be supplied to the dryer. Thus, in addition to the same actions and effects as obtained by the second aspect of the invention, there is obtained the advantage that the temperature and flow rate of the drying air fed to the dryer can be adjusted more easily.

A third aspect of the present invention is an apparatus for producing reduced iron by agglomerating a powder of a reducing agent and a powder of iron oxide in a pelletizer to form compacts or in a briquetter to form briquettes, drying the compacts in a dryer, and reducing the dried compacts in a high temperature atmosphere in a reducing furnace, wherein a hot stove for generating a hot gas is disposed on a drying gas introduction side of the dryer, and the hot gas from the hot stove is supplied to the dryer as a drying gas.

According to this aspect of the invention, in addition to the same actions and effects as obtained by the second aspect of the invention, there is obtained the advantage that the operation of the dryer can be controlled easily by arbitrarily adjusting the temperature and flow rate of the hot gas generated by the hot stove.

BRIEF DESCRIPTION OF THE DRAWINGS

The above and other objects, features and advantages of the present invention will become more apparent from the following description taken in connection with the accompanying drawings, in which:

FIG. 1 (a) shows data indicating the conditions for and the results of compact (wet green compact, WGC) drying as a first embodiment of the present invention;

DETAILED DESCRIPTION OF THE PREFERRED EMBODIMENTS

Embodiments of the present invention will now be described in detail with reference to the accompanying drawings, which in no way limit the invention.

[First Embodiment]

Figure 1A:
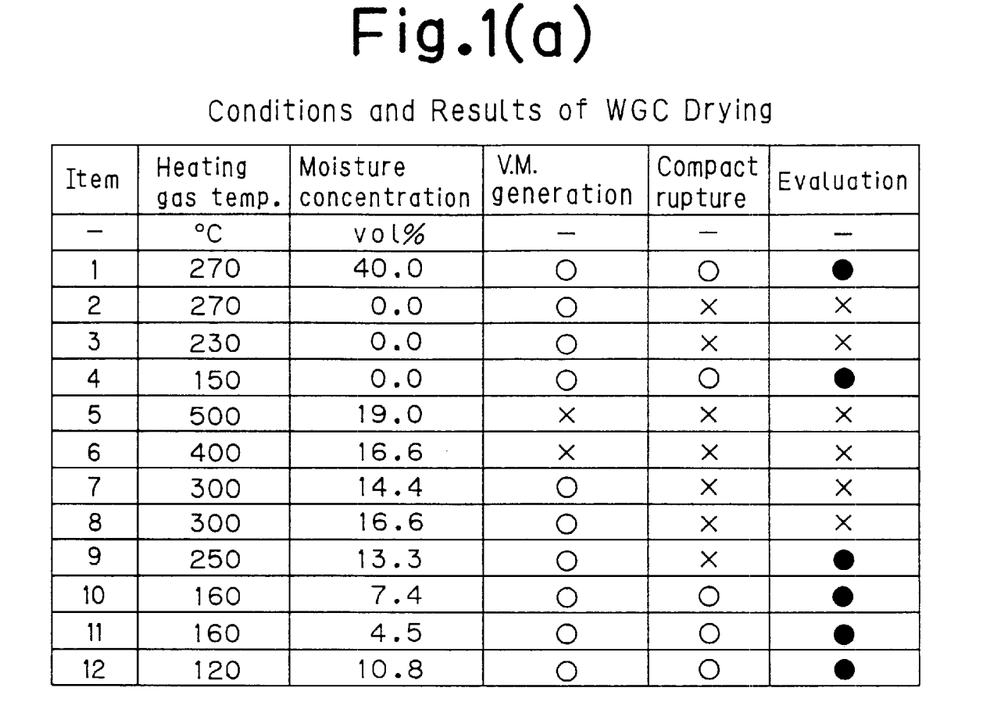
Figure 1B:
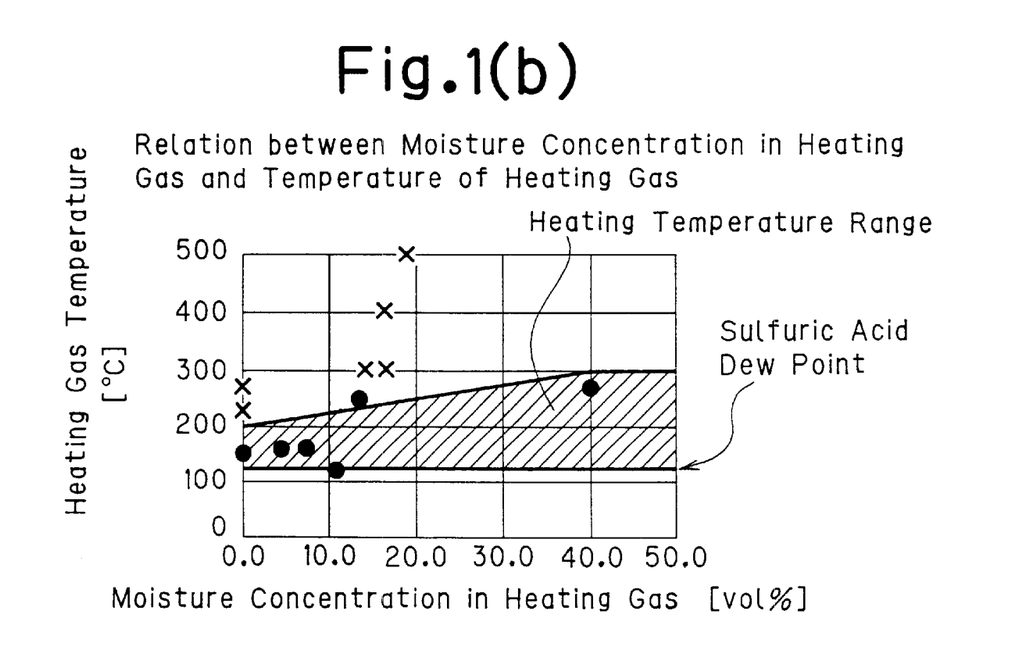
FIG. 1(b) is a graph showing the relation between the moisture concentration in a heating gas and the temperature of the heating gas.

FIG. 1 (a) shows data indicating the conditions for and the results of compact (wet green compact, WGC) drying as a first embodiment of the present invention. FIG. 1 (b) is a graph showing the relation between the moisture concentration in a heating gas and the temperature of the heating gas.

As shown in FIGS. 1 (a) and 1 (b), the inventors conducted experiments with an apparatus for producing reduced iron by agglomerating a powder of a reducing agent and a powder of iron oxide in a pelletizer to form compacts or in a briquetter to form briquettes, drying the compacts in a dryer, and reducing the dried compacts in a high temperature atmosphere in a reducing furnace. From the experiments, they found a method for setting the temperature range of a heating gas for drying the compacts in the dryer as an equation dependent on the moisture concentration. The equation is offered below. In the column "VM generation" of FIG. 1(a), ○ represents no generation of VM, and X represents the generation of VM. In the column "Compact rupture", ○ represents no compact rupture, and X represents compact rupture. In the column "Evaluation", ● represents ○ for both of VM generation and compact rupture, while X represents X for one or both of VM generation and compact rupture. In FIGS. 1 (a) and 1 (b), the bulk flow velocity of the heating gas is 5.0 m/s or less.

$$\text{Sulfuric acid dew point} \leq T_g \leq 100/40 \cdot C_{H2O} + 200$$

where $T_g$ denotes the temperature [° C.] of the heating gas, and $C_{H2O}$ denotes a moisture concentration [vol %] in the heating gas.

According to the above equation, a high gas temperature adapted for the moisture concentration (moisture content) in the heating gas can be set. Thus, the drying time can be shortened, and highly efficient, stable drying can be performed, so that high quality reduced iron can be produced stably. Furthermore, the temperature of the heating gas on the exit side of the dryer is a high temperature above the sulfuric acid dew point. Thus, acid corrosion of piping, etc. minimally occurs.

In the apparatus for producing reduced iron, which uses coal containing VM as the reducing agent, the temperature $T_g$ of the heating gas is set at $T_g \leq 300°$ C. Thus, compact rupture or evaporation of VM from coal in the dryer can be prevented. Consequently, ignition of coal, or a decrease in the thermal efficiency in the reducing furnace in the subsequent step can be prevented.

As described above, a high gas temperature adapted for the moisture concentration (moisture content) in the heating gas can be set according to the present embodiment. Therefore, wet compacts can be prevented from becoming large lumps, and peeling of the surface portion of the compacts, or rupture of the compacts in the reducing furnace can be avoided, in an iron oxide reducing apparatus, as shown in FIG. 6, which cools a hot off-gas from the reducing furnace by a water spray type primary cooler and a water spray type secondary cooler, and which has a dryer using the cooled hot off-gas as a heating gas. Needless to say, the present embodiment can be applied to an iron oxide reducing apparatus equipped with a dryer using hot air from a heat exchanger or the like as a heat source for drying compacts (wet compacts).

[Second Embodiment]

Figure 2:
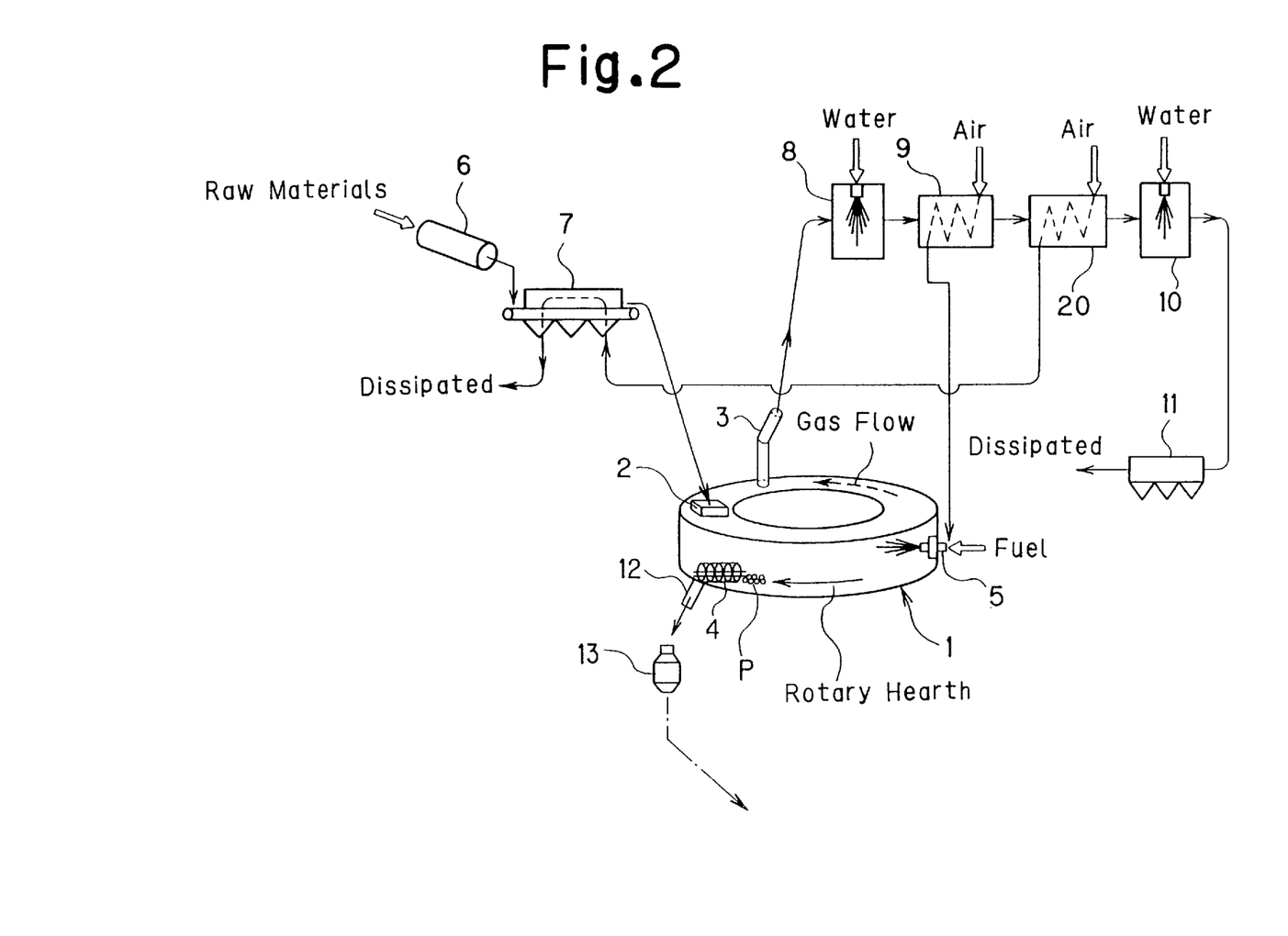
FIG. 2 is a schematic constitution drawing of an apparatus for producing reduced iron, showing a second embodiment of the invention.

FIG. 2 is a schematic constitution drawing of an apparatus for producing reduced iron, showing a second embodiment of the invention. In FIG. 2, the same members as in FIG. 6 explained in connection with the earlier technology are assigned the same reference numerals, and overlapping explanations are omitted.

In the present embodiment, a heat exchanger 20 for heating incoming air is provided. Drying air, which has been heated by the heat exchanger 20, is supplied to a dryer 7. This moisture-poor drying air dries compacts (wet compacts).

As shown in FIG. 2, the heat exchanger 20 of the invention (the second heat exchanger in the second aspect of the invention) is disposed on the exit side of a heat exchanger 9 (the first heat exchanger in the second aspect of the invention). This heat exchanger 20 heats incoming air, for example, by passing a constant amount of the incoming air through a pipe, and flowing a hot off-gas from the heat exchanger 9 outside the pipe for heat exchange. This heated incoming air is supplied to the dryer 7 as drying air.

On the exit side of the heat exchanger 20, a secondary cooler 10 of a water spray type is disposed for cooling the hot off-gas discharged from the heat exchanger 20. On the exit side of the secondary cooler 10, a dust collector 11 is disposed for cleaning the cooled hot off-gas. Other constitutions are the same as in FIG. 6 showing the earlier technology, and their explanations are omitted.

According to the foregoing constitution, a powder of coal (reducing agent) and a powder of iron ore (iron oxide) as raw materials are formed into compacts by a pelletizer or a briquetter 6, and dried by the dryer 7. Then, the dried compacts (dry compacts) are fed to an introducing device 2 of a reducing furnace 1.

The drying air fed to the dryer 7 is the incoming air heated by the heat exchanger 20. This incoming air flows as an upflow through an inlet at a lower portion of the dryer 7, and dries the compacts (wet compacts). Then, this drying air flows as a downflow, is discharged out of the system through an outlet, and dissipated into the air. Inside the dryer 7, the compacts (wet compacts) are dried with the drying air scant in moisture. Thus, the condensation and deposition of moisture on the compacts are prevented. Consequently, sticking of the compacts to each other does not take place, and the compacts are uniformly dried.

While a rotary hearth of the reducing furnace 1 is making nearly one rotation, the dried compacts (dry compacts) fed onto the rotary hearth undergo a reductive action by radiant heat due to combustion caused by a burner 5 supplied with fuel and combustion air. The reduced compacts P are discharged from a screw type discharger 4, delivered to a portable container 13 by a discharge chute 12, and transported to a subsequent step.

The hot off-gas is discharged from an off-gas duct 3, and primarily cooled by a primary cooler 8 of a water spray type, and then brought to the heat exchanger 9, where the off-gas exchanges heat with the combustion air. Further, the off-gas is carried to the heat exchanger 20 for heat exchange with incoming air, and secondarily cooled by the secondary cooler 10 of a water spray type. Then, the cooled off-gas is passed through the dust collector 11, where it is cleaned, and then dissipated into the air.

According to the present embodiment, as described above, the heat exchanger 20 for heating incoming air is provided on the exit side of the heat exchanger 9. The heated incoming air is supplied to the dryer 7 as drying air. Thus, the compacts (wet compacts) are dried with the drying air scant in moisture. As a result, sticking of the compacts to each other does not take place (growth of the compacts to large lumps is prevented), and the compacts are uniformly dried. Since the compacts are uniformly dried to leave no moisture behind inside the compacts, peeling of the surface portion, or rupture of the compacts can be avoided, in the reducing furnace 1 in the subsequent step. Moreover, high quality dry compacts are formed, and the supply of these compacts to the rotary hearth type reducing furnace can result in the stable production of high quality reduced iron.

In the present embodiment as well, the temperature of the heating gas (incoming air) in the dryer 7 may be controlled in accordance with the moisture concentration (moisture content) of the heating gas by use of the equation indicated in the First Embodiment, thereby achieving a further improvement in the drying efficiency.

[Third Embodiment]

Figure 3:
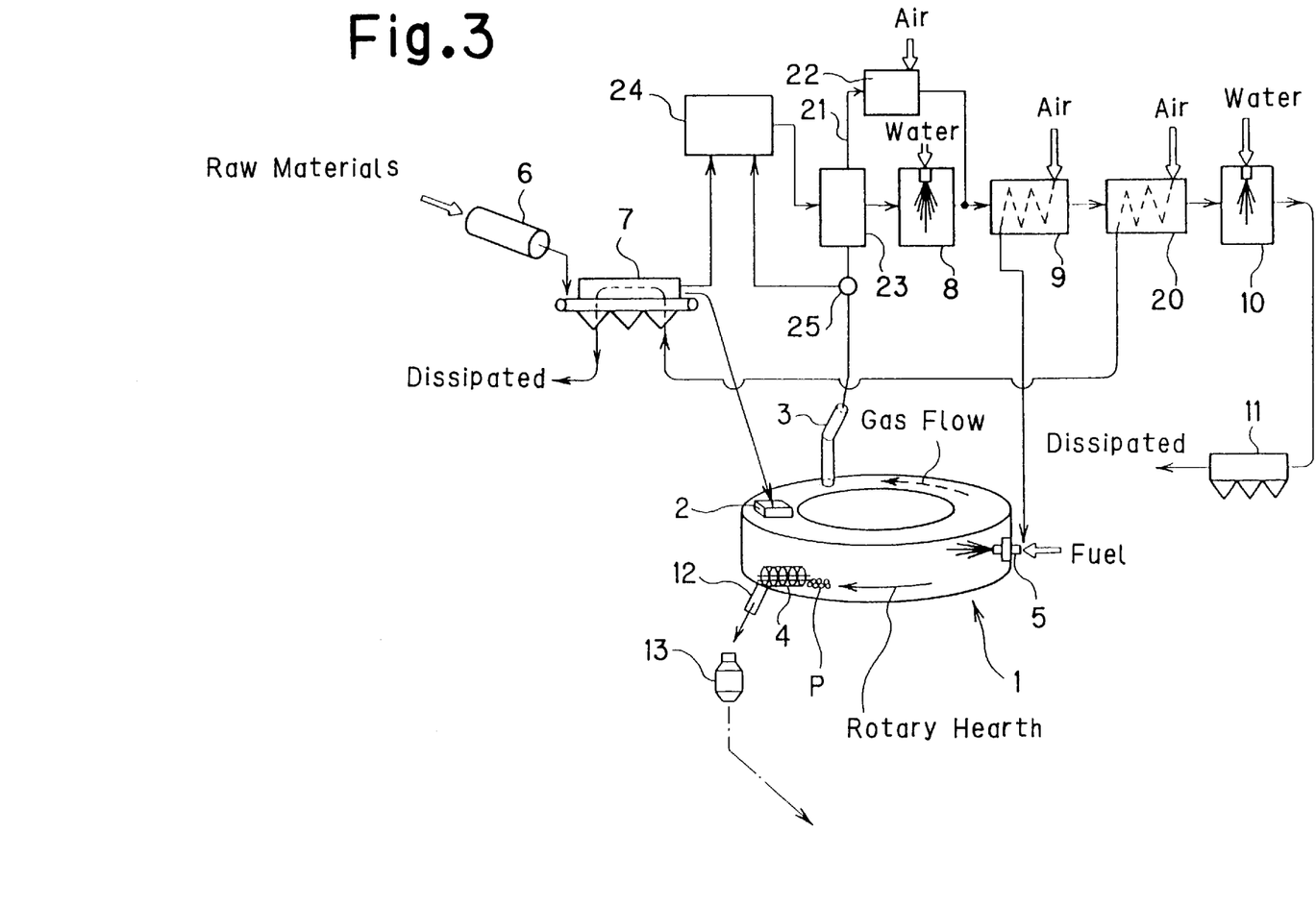
FIG. 3 is a schematic constitution drawing of an apparatus for producing reduced iron, showing a third embodiment of the invention.

FIG. 3 is a schematic constitution drawing of an apparatus for producing reduced iron, showing a third embodiment of the invention. In FIG. 3, the same members as in FIG. 6 explained in connection with the earlier technology, and in FIG. 2 of the Second Embodiment are assigned the same reference numerals, and overlapping explanations are omitted.

In the present embodiment, a bypass path 21 is provided for bypassing the primary cooler 8 in the Second Embodiment (the first cooler in the aforementioned optional aspect of the invention), an air introduction type cooler (the second cooler in the aforementioned optional aspect of the invention) 22 is provided on the bypass path 21, and a controller (a control means) 24 is provided for switching a valve 23 provided at a bifurcation upstream from the bypass path 21 to select either the primary cooler 8 or the cooler 22 based on a trade-off between the flow rate of the hot off-gas and the flow rate of the compacts to a dryer 7. In more detail, the controller 24 receives a detection signal from a flow meter 25 which is interposed downstream from an off-gas duct 3 to detect the flowrate of the hot off-gas, and a detection signal from a flow meter (not shown) which is provided in the dryer 7 to detect the flow rate of compacts (wet compacts) fed to the dryer 7.

According to the present embodiment, in addition to the same actions and effects as obtained by the Second Embodiment, the heat exchange efficiency of a heat exchanger 9 and a heat exchanger 20 is increased, for example, by passing the hot off-gas through the air introduction type cooler 22, rather than passing the hot off-gas through the primary cooler 8, on an unsteady occasion immediately after initiation of operation of the apparatus. Consequently, even more efficient, stable drying can be performed in the dryer 7. On this occasion, condensation of moisture on the wet compacts, followed by mutual sticking of the compacts and associated growth of the compacts to large lumps, can be prevented. Furthermore, peeling of the surface portion from the compacts, or rupture of the compacts can be avoided in the reducing furnace 1 in the subsequent step.

In the present embodiment as well, the temperature of the heating gas (incoming air) in the dryer 7 may be controlled in accordance with the moisture concentration (moisture content) in the heating gas by use of the equation indicated in the First Embodiment, whereby a further improvement in the drying efficiency can be achieved.

As a modification of the present embodiment, the primary cooler 8 may be composed of a cooler having a water line and an air line, instead of providing the bypass path 21. Either the water line or the air line may be selected by the controller 24 based on a trade-off between the flow rate of the hot off-gas and the flow rate of compacts to the dryer.

[Fourth Embodiment]

Figure 4:
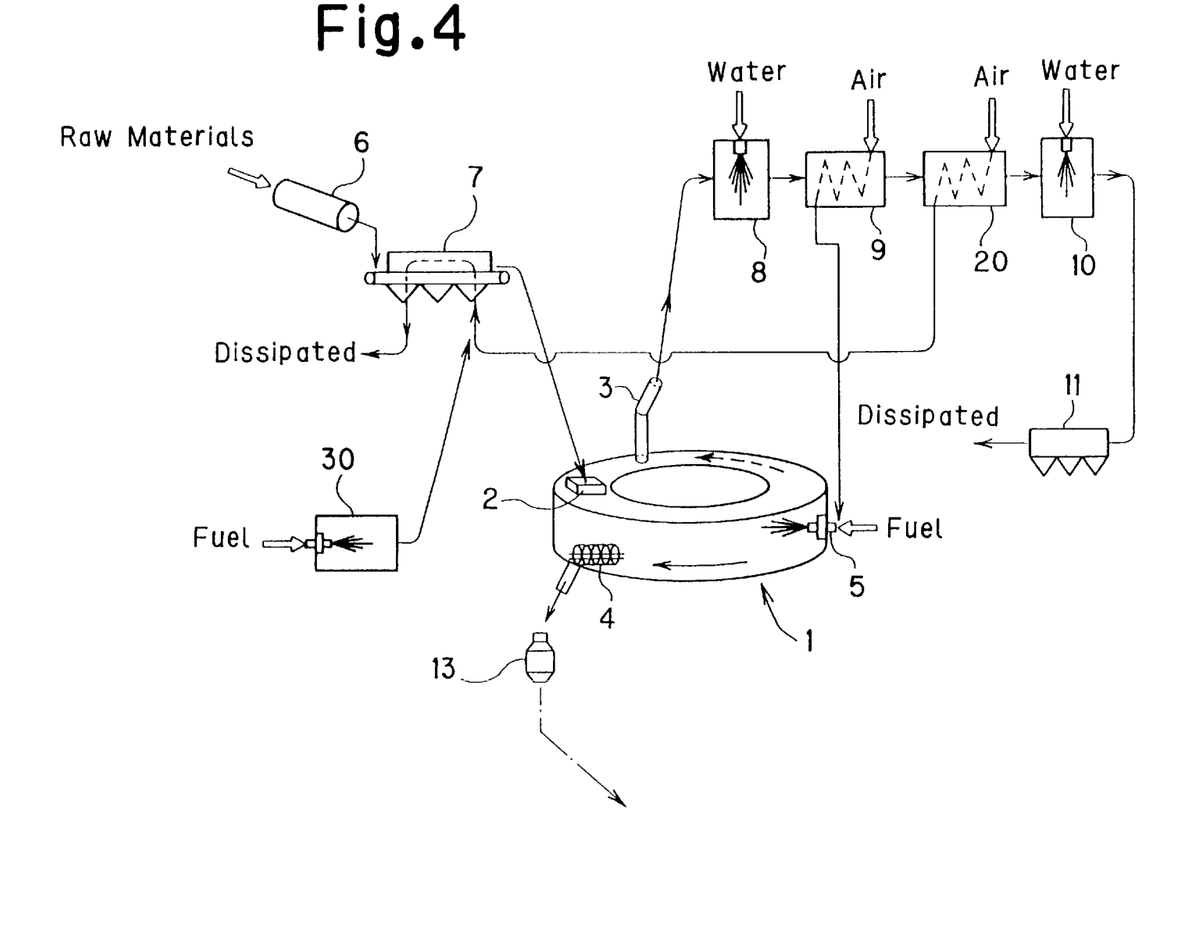
FIG. 4 is a schematic constitution drawing of an apparatus for producing reduced iron, showing a fourth embodiment of the invention.

FIG. 4 is a schematic constitution drawing of an apparatus for producing reduced iron, showing a fourth embodiment of the invention. In FIG. 4, the same members as in FIG. 6 explained in connection with the earlier technology, and in FIG. 2 of the Second Embodiment are assigned the same reference numerals, and overlapping explanations are omitted.

The present embodiment corresponds to the Second Embodiment of FIG. 2, in which a hot stove 30 is additionally disposed on a drying air introduction side of a dryer 7, and is connected to a drying air inlet located at a lower portion of the dryer 7 so that a hot gas generated by the hot stove 30 is supplied through the inlet together with drying incoming air from a heat exchanger 20. Other constitutions are the same as in the Second Embodiment.

The drying air fed to the dryer 7 is a combination of the incoming air heated by the heat exchanger 20, and the hot gas generated by the hot stove 30 and supplied supplementally. This combined fluid flows as an upflow through the drying air inlet at the lower portion of the dryer 7, and dries the compacts (wet compacts). Then, this fluid flows as a downflow, is discharged out of the system through an outlet, and dissipated into the air. Inside the dryer 7, the wet compacts are dried with the drying air scant in moisture. Thus, the condensation of moisture on the wet compacts is prevented. Consequently, sticking of the wet compacts to each other does not take place, and the wet compacts are uniformly dried.

In response to changes in the temperature and flow rate of the drying air fed from the heat exchanger 20, the temperature and flow rate of the hot gas fed from the hot stove 30 are adjusted, whereby the operation of the dryer 7 can be controlled easily.

According to the present embodiment, as described above, the heat exchanger 20 for heating drying air, and the hot stove 30 for generating a hot gas are provided concurrently to supply both the drying air and the hot gas to the dryer 7. Thus, in addition to the same actions and effects as obtained by the Second Embodiment, there is obtained the advantage that the temperature and flow rate of the drying air fed to the dryer 7 can be adjusted more easily.

[Fifth Embodiment]

Figure 5:
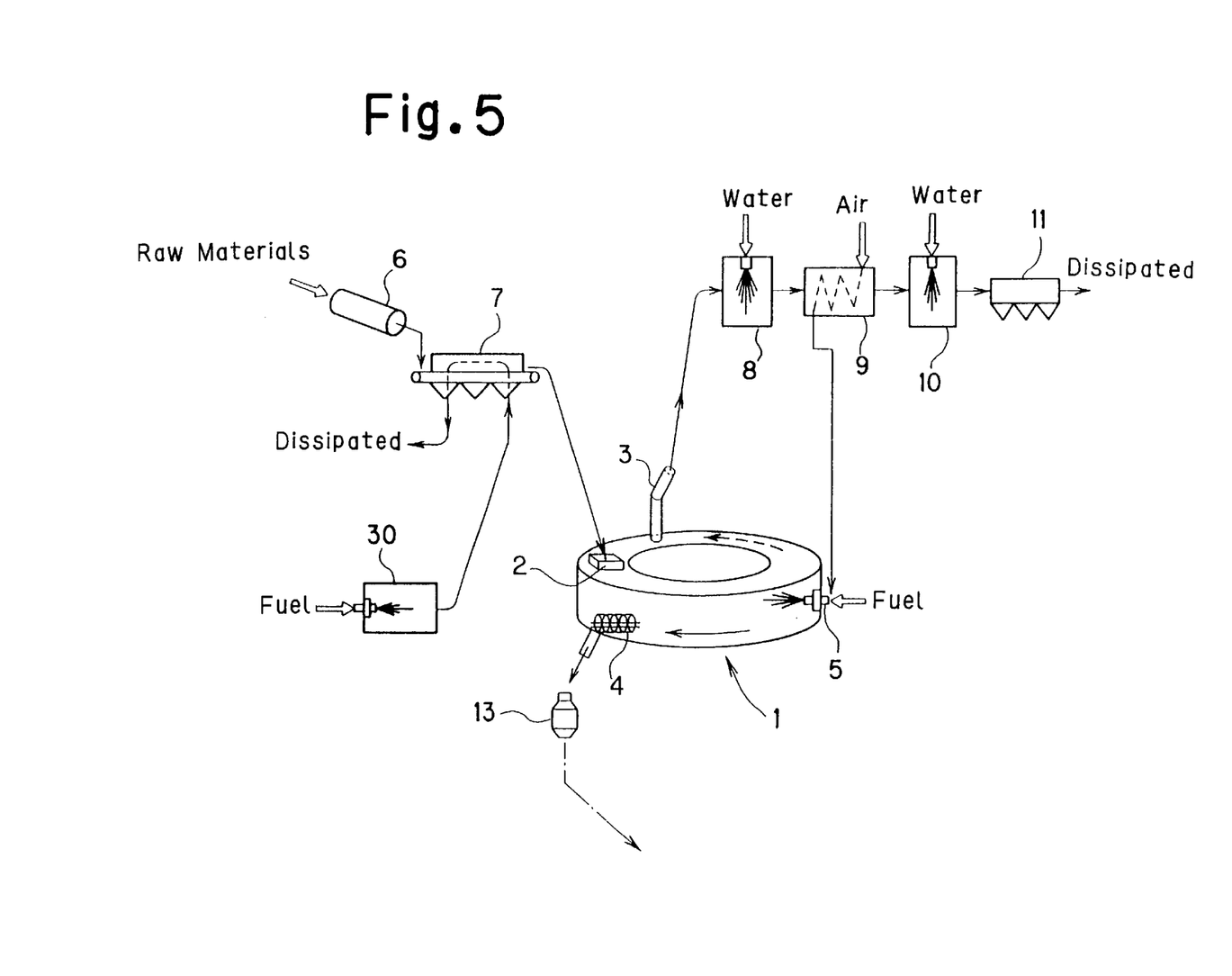
FIG. 5 is a schematic constitution drawing of an apparatus for producing reduced iron, showing a fifth embodiment of the invention.

FIG. 5 is a schematic constitution drawing of an apparatus for producing reduced iron, showing a fifth embodiment of the invention. In FIG. 5, the same members as in FIG. 6 explained in connection with the earlier technology, and in FIG. 2 of the Second Embodiment are assigned the same reference numerals, and overlapping explanations are omitted.

The present embodiment corresponds to the Second Embodiment of FIG. 2, in which the heat exchanger 20 is abolished, and only a hot stove 30 is disposed on a drying gas introduction side of a dryer 7, and is connected to a drying gas inlet located at a lower portion of the dryer 7 so that a hot gas generated by the hot stove 30 is supplied through the inlet. Other constitutions are the same as in the Second Embodiment.

A drying gas fed to the dryer 7 is the hot gas generated by the hot stove 30. The hot gas generated by the hot stove 30 flows as an upflow through the drying gas inlet at the lower portion of the dryer 7, and dries wet compacts. Then, the hot gas flows as a downflow, is discharged out of the system through an outlet, and dissipated into the air. Inside the dryer 7, the wet compacts are dried with the drying gas scant in moisture. Thus, the condensation of moisture on the wet compacts is prevented. Consequently, sticking of the wet compacts to each other does not take place, and the wet compacts are uniformly dried.

The foregoing constitution eliminates influences from the temperature and flow rate of the hot off-gas from the reducing furnace 1. The operation of the dryer 7 can be controlled easily by arbitrarily adjusting the temperature and flow rate of the hot gas generated by the hot stove 30.

According to the present embodiment, as described above, the hot stove 30 for generating a hot gas is disposed, and the hot gas is supplied to the dryer 7 as a drying gas. Thus, in addition to the same actions and effects as obtained by the Second Embodiment, there is obtained the advantage that the temperature and flow rate of the drying gas fed to the dryer 7 can be adjusted more easily.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for drying compacts, said method being applied to an apparatus for producing reduced iron by mixing and agglomerating a powder of a reducing agent and a powder of iron oxide in a pelletizer or in a briquetter to form compacts, drying the compacts in a dryer, and reducing the dried compacts in a high temperature atmosphere in a reducing furnace, wherein a temperature range of a heating gas supplied to the dryer is set based on the following equation:

$$\text{Sulfuric acid dew point} \leq T_g \leq 100/40 \cdot C_{H_2O} + 200$$

where $T_g$ denotes a temperature [° C.] of the heating gas, and $C_{H_2O}$ denotes a moisture concentration [vol %] in the heating gas.

2. The method for drying compacts as claimed in claim 1, wherein the apparatus for producing reduced iron uses coal as the reducing agent, and the temperature $T_g$ of the heating gas is set at $T_g \leq 300°$ C.

3. A method of producing dried iron ore compacts, comprising the steps of:

mixing and agglomerating a powder of a reducing agent and a powder of iron oxide to form wet compacts;

inserting the wet compacts into a dryer; and supplying a heated drying gas to the dryer to dry the wet compacts into dry compacts;

wherein the heated drying gas is controlled as to its moisture content so that it may be maintained above the dew point of sulfuric acid and to prevent the compacts from sticking to each other.

4. The method of producing dried iron ore compacts as claimed in claim 3, wherein the heated drying gas has a temperature which is defined as:

$$\text{sulfuric acid dew point} \leq T_g \leq 100/40 \cdot C_{H_2O} + 200$$

where $T_g$ denotes the temperature [° C.] of the heated drying gas, and $C_{H_2O}$ denotes the moisture concentration [vol. %] in the heated drying gas.

5. The method of producing dried iron ore compacts as claimed in claim 4, wherein the reducing agent is coal, and the temperature of the heated drying gas is defined as:

$$T_g \leq 300° \text{ C.}$$

6. The method of producing dried iron ore compacts as claimed in claim 3, wherein the heated drying gas is provided by heating air in a second heat exchanger at the exit of a first heat exchanger which supplies heated air to a reducing furnace, both heat exchangers being heated by the off-gas from the reducing furnace.

7. The method of producing dried iron ore compacts as claimed in claim 6, wherein the heated drying gas has a temperature which is defined as:

$$\text{sulfuric acid dew point} \leq T_g \leq 100/40 \cdot C_{H_2O} + 200$$

where $T_g$ denotes the temperature [° C.] of the heated drying gas, and $C_{H_2O}$ denotes the moisture concentration [vol. %] in the heated drying gas.

8. The method of producing dried iron ore compacts as claimed in claim 7, wherein the reducing agent is coal, and the temperature of the heated drying gas is defined as:

$$T_g \leq 300° \text{ C.}$$

9. The method of producing dried iron ore compacts as claimed in claim 6, wherein at least a portion of the heated drying gas is supplied by a separate heater.

10. The method of producing dried iron ore compacts as claimed in claim 9, wherein the heated drying gas has a temperature which is defined as:

$$\text{sulfuric acid dew point} \leq T_g \leq 100/40 \cdot C_{H_2O} + 200$$

where $T_g$ denotes the temperature [° C.] of the heated drying gas, and $C_{H_2O}$ denotes the moisture concentration [vol. %] in the heated drying gas.

11. The method of producing dried iron ore compacts as claimed in claim 10, wherein the reducing agent is coal, and the temperature of the heated drying gas is defined as:

$$T_g \leq 300° \text{ C.}$$

* * * * *